US009204299B2

(12) United States Patent
McCann et al.

(10) Patent No.: US 9,204,299 B2
(45) Date of Patent: Dec. 1, 2015

(54) EXTENDED SERVICE SET TRANSITIONS IN WIRELESS NETWORKS

(75) Inventors: Stephen McCann, Southhampton (GB); Michael Montemurro, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 64 days.

(21) Appl. No.: 13/469,618

(22) Filed: May 11, 2012

(65) Prior Publication Data

US 2013/0301607 A1 Nov. 14, 2013

(51) Int. Cl.
*H04W 12/06* (2009.01)
*H04W 36/14* (2009.01)
*H04W 12/04* (2009.01)
*H04W 36/00* (2009.01)

(52) U.S. Cl.
CPC ............ *H04W 12/06* (2013.01); *H04W 12/04* (2013.01); *H04W 36/0072* (2013.01); *H04W 36/0077* (2013.01); *H04W 36/14* (2013.01)

(58) Field of Classification Search
CPC ..... H04W 36/14; H04W 48/16; H04W 12/06; H04W 48/18; H04W 36/005; H04W 64/00; H04W 28/18; H04W 36/36; H04L 12/5692; H04L 41/0856
USPC ........... 370/328–329, 331–334; 455/436–444
See application file for complete search history.

(56) References Cited

U.S. PATENT DOCUMENTS

| 6,493,561 | B1 | 12/2002 | Hasegawa |
| 7,010,305 | B2 | 3/2006 | Immonen et al. |
| 7,065,645 | B2 | 6/2006 | Teicher |
| 7,151,764 | B1 | 12/2006 | Heinonen et al. |
| 7,187,691 | B2 | 3/2007 | Gavette |
| 7,277,932 | B2 | 10/2007 | Adachi et al. |

(Continued)

FOREIGN PATENT DOCUMENTS

| EP | 1 919 154 A1 | 5/2008 |
| EP | 2 076 090 A1 | 7/2009 |

(Continued)

OTHER PUBLICATIONS

Bajko, G., "Tutorial on Location and Emergency Services," IEEE, IEEE Meeting Hawaii 2008, Sep. 10, 2008, slides 1-45.

(Continued)

*Primary Examiner* — Michael Thier
*Assistant Examiner* — Eric Myers
(74) *Attorney, Agent, or Firm* — Conley Rose, P.C.; J. Roberts Brown, Jr.

(57) ABSTRACT

A mobile device may transition between Extended Service Set ("ESS") networks seamlessly, such that a consumer never loses the network connection despite the transition. The communication for enabling a transition may be prior to association with that network. The seamless transition may be enabled through the creation and utilization of a central key holder authority that advertises its identity to mobile devices in a pre-associated state. The mobile device can use the key discovery communication along with a key generation method to authenticate and/or associate with a network and transition from one ESS to another. There may be a common root key across ESSs. At each new access point ("AP") that the mobile device encounters, ESS and key holder identities may be discovered through discovery communications.

22 Claims, 9 Drawing Sheets

(56) References Cited

U.S. PATENT DOCUMENTS

| | | | |
|---|---|---|---|
| 7,606,209 B2 | 10/2009 | Watanabe | |
| 7,683,773 B1 | 3/2010 | Goodall et al. | |
| 7,684,333 B1 | 3/2010 | Dasylva et al. | |
| 8,274,908 B2 | 9/2012 | Hsin et al. | |
| 2002/0159418 A1 | 10/2002 | Rudnick et al. | |
| 2003/0103521 A1 | 6/2003 | Raphaeli et al. | |
| 2003/0134636 A1 | 7/2003 | Sundar et al. | |
| 2003/0217168 A1 | 11/2003 | Adachi et al. | |
| 2005/0097362 A1 | 5/2005 | Winget et al. | |
| 2005/0210523 A1 | 9/2005 | Parnell et al. | |
| 2005/0286456 A1 | 12/2005 | McNew | |
| 2006/0067526 A1 | 3/2006 | Faccin et al. | |
| 2006/0109113 A1 | 5/2006 | Reyes et al. | |
| 2006/0221901 A1 | 10/2006 | Yaqub et al. | |
| 2007/0041344 A1* | 2/2007 | Yaqub et al. | 370/331 |
| 2007/0064660 A1 | 3/2007 | Qi et al. | |
| 2007/0086359 A1* | 4/2007 | Yaqub | 370/254 |
| 2007/0124592 A1 | 5/2007 | Oyama | |
| 2007/0153732 A1* | 7/2007 | Yao | 370/329 |
| 2007/0230389 A1 | 10/2007 | Amann et al. | |
| 2007/0230423 A1 | 10/2007 | Yoshida et al. | |
| 2008/0031212 A1 | 2/2008 | Ogura | |
| 2008/0049761 A1 | 2/2008 | Lin et al. | |
| 2008/0141031 A1 | 6/2008 | Oba et al. | |
| 2008/0151796 A1 | 6/2008 | Jokela | |
| 2008/0178277 A1 | 7/2008 | Oba et al. | |
| 2008/0261574 A1 | 10/2008 | Rinta-Aho et al. | |
| 2008/0270534 A1 | 10/2008 | Xia et al. | |
| 2008/0298333 A1 | 12/2008 | Seok | |
| 2009/0010399 A1 | 1/2009 | Kim et al. | |
| 2009/0031138 A1 | 1/2009 | Nakhjiri | |
| 2009/0047922 A1 | 2/2009 | Buckley et al. | |
| 2009/0047974 A1 | 2/2009 | Quinn | |
| 2009/0177759 A1 | 7/2009 | Ogawa et al. | |
| 2009/0247111 A1 | 10/2009 | Sennett et al. | |
| 2009/0252165 A1 | 10/2009 | Zhang et al. | |
| 2009/0296688 A1 | 12/2009 | Bakker et al. | |
| 2009/0296689 A1 | 12/2009 | Bakker et al. | |
| 2009/0298458 A1 | 12/2009 | Bakker et al. | |
| 2010/0146272 A1 | 6/2010 | Centonza et al. | |
| 2010/0216434 A1 | 8/2010 | Marcellino et al. | |
| 2010/0275249 A1 | 10/2010 | McCann et al. | |
| 2010/0325714 A1 | 12/2010 | Iyer et al. | |
| 2011/0040969 A1 | 2/2011 | Yao et al. | |
| 2011/0149938 A1 | 6/2011 | Bajko | |
| 2011/0280227 A1 | 11/2011 | McCann et al. | |
| 2012/0017267 A1 | 1/2012 | McCann et al. | |
| 2012/0076117 A1 | 3/2012 | Montemurro et al. | |
| 2012/0076118 A1 | 3/2012 | Montemurro et al. | |
| 2012/0243524 A1 | 9/2012 | Verma et al. | |
| 2013/0012260 A1* | 1/2013 | Salkintzis et al. | 455/550.1 |
| 2013/0070739 A1 | 3/2013 | McCann et al. | |

FOREIGN PATENT DOCUMENTS

| | | |
|---|---|---|
| EP | 2 093 967 A2 | 8/2009 |
| WO | WO 2007/083824 A1 | 7/2007 |
| WO | WO 2007/103055 A2 | 9/2007 |
| WO | WO 2009/101861 A1 | 8/2009 |
| WO | WO 2011/056307 | 5/2011 |

OTHER PUBLICATIONS

EPO Communication regarding Deficiencies in Written Opinion of the International Searching Authority dated Aug. 1, 2012 for corresponding European Application No. 10798589.7, 2 pages.
EPO Communication regarding Deficiencies in Written Opinion of the International Searching Authority dated Dec. 21, 2012 for corresponding European Application No. 11726170.1, 2 pages.
EPO Communication regarding Deficiencies in Written Opinion of the International Searching Authority dated Dec. 21, 2012 for corresponding European Application No. 11726171.9, 2 pages.
EPO Communication regarding Deficiencies in Written Opinion of the International Searching Authority dated Dec. 21, 2012 for corresponding European Application No. 11726172.7, 2 pages.
EPO Communication regarding Deficiencies in Written Opinion of the International Searching Authority dated Dec. 21, 2012 for corresponding European Application No. 11733699.0, 2 pages.
EPO Communication regarding Deficiencies in Written Opinion of the International Searching Authority dated Oct. 23, 2012 for corresponding European Application No. 11715272.8, 2 pages.
EPO Communication regarding Deficiencies in Written Opinion of the International Searching Authority dated Oct. 23, 2012 for corresponding European Application No. 11715273.6, 2 pages.
Hiller, T. et al., "A Container Type for the Extensible Authentication Protocol (EAP)," Network Working Group, Internet-Draft, <draft-hiller-eap-tlv-01.txt>, Internet Engineering Task Force Standard Working Draft, The Internet Society, May 2003, 10 pages.
IEEE P802.11 Wireless LANs, "TGae Requirements and Use Cases," Jan. 21, 2010, IEEE 802.11-10/0093r5, 6 pages.
IEEE Standard for Information Technology—Telecommunications and information exchange between systems—Local and metropolitan area network—Specific requirements, "Part 11: Wireless LAN Medium Access Control (MAC) and Physical Layer (PHY) Specifications, Amendment 1: Radio Resource Measurement of Wireless LANs," IEEE Std 802.11k-2008, IEEE computer Society, Jun. 12, 2008, pp. 5, 58-61, 75-77, 100-105, 127 (244 pages).
IEEE Standard for Information Technology—Telecommunications and information exchange between systems—Local and metropolitan area networks—Specific requirements, "Part 11; Wireless LAN Medium Access Control (MAC) and Physical Layer (PHY) Specifications, Amendment 9: Interworking with External Networks," IEEE Std 802.11u-2011, Feb. 25, 2011, pp. 8, 75-86 (208 pages).
IEEE Standard for Information Technology—Telecommunications and information exchange between systems—Local and metropolitan area networks—Specific requirements, "Part 11; Wireless LAN Medium Access Control (MAC) and Physical Layer (PHY) Specifications," IEEE Std 802.11-2012, Mar. 29, 2012, pp. 54, 91, 196-199, 580-584, 712-726, 742-743, 1145-1156 (2793 pages).
IEEE Standard for Information Technology, "Part 11: Wireless LAN Medium Access Control (MAC) and Physical Layer (PHY) specifications, Amendment 8: Medium Access Control (MAC) Quality of Service Enhancements," IEEE Std 802.11e-2005, Nov. 11, 2005, 211 pages.
International Preliminary Report on Patentability dated Nov. 20, 2012 for corresponding International Application No. PCT/IB2011/001006, 10 pages.
International Preliminary Report on Patentability dated Nov. 20, 2012 for corresponding International Application No. PCT/IB2011/001008, 10 pages.
International Preliminary Report on Patentability dated Nov. 20, 2012 for corresponding International Application No. PCT/IB2011/001018, 7 pages.
International Preliminary Report on Patentability dated Nov. 20, 2012 for corresponding International Application No. PCT/IB2011/001023, 6 pages.
International Preliminary Report on Patentability dated Sep. 27, 2012 for corresponding International Patent Application No. PCT/IB2011/051040, 9 pages.
International Preliminary Report on Patentability dated Sep. 27, 2012 for corresponding International Patent Application No. PCT/IB2011/051044, 9 pages.
International Search Report and Written Opinion dated Dec. 10, 2012 for corresponding International Application No. PCT/CA2012/050635, 10 pages.
International Search Report and Written Opinion dated Jan. 9, 2013 for PCT Application No. PCT/CA2012/050793, 9 pages.
International Search Report and Written Opinion dated Jul. 27, 2011 for corresponding International Application No. PCT/IB2011/001006, 14 pages.
International Search Report and Written Opinion dated Jul. 27, 2011 for corresponding International Application No. PCT/IB2011/001008, 14 pages.
International Search Report and Written Opinion dated Jun. 30, 2011 in corresponding application No. PCT/IB2011/051040, 14 pages.

(56) References Cited

OTHER PUBLICATIONS

International Search Report and Written Opinion dated Jun. 30, 2011 in corresponding application No. PCT/IB2011/051044, 14 pages.
International Search Report and Written Opinion dated May 9, 2011 for corresponding International Application No. PCT/IB2010/002932, 12 pages.
International Search Report and Written Opinion dated Nov. 28, 2011 for corresponding International Application No. PCT/IB2011/001018, 10 pages.
International Search Report and Written Opinion dated Oct. 5, 2011 for corresponding International Application No. PCT/IB2011/001023, 11 pages.
Li, W. et al., "A Reliable Active Scanning Scheme for the IEEE 802.11 MAC Layer Handoff," University of Cincinnati, Sep. 8, 2003, pp. 71-74.
McCann, S., IEEE P802.11, Wireless LANs, Emergency URN Information, IEEE 802.11-10/0026r1, Jan. 2010, 6 pages.
Rosen et al, "Framework for Emergency Calling Using Internet Multimedia; draft-ietf-ecrit-framework-10," IETF, Internet Society (ISOC) 4, Jul. 27, 2009, pp. 1-37.
Schulzrinne et al., "Extensions to the Emergency Services Architecture for dealing with Unauthenticated and Unauthorized Devices; draft-schulzrinne-ecrit-unauthenticated-access-06.txt," IETF, Internet Society (ISOC) 6, Oct. 26, 2009, pp. 1-23.
International Search Report and Written Opinion mailed Aug. 2, 2013 for corresponding International Application No. PCT/CA2013/050362, 10 pages.
Taiwan Office Action; Application No. 102116774; Oct. 27, 2014; 16 pages.
Taiwan Office Action; Application No. 102116774; Jun. 12, 2015; 16 pages.

* cited by examiner

EXTENDED SERVICE SET TRANSITIONS IN WIRELESS NETWORKS

BACKGROUND

Wireless network deployments, such as wireless local area networks ("WLANs"), allow mobile devices to access network and Internet services when within proximity of wireless communication signals of those wireless networks. Through network discovery communications with the WLAN, a mobile device or station ("STA") may obtain network information about an access point ("AP") or access network. Access Network Query Protocol ("ANQP") may allow a STA to request additional network information prior to establishing network connectivity. Such network information may include access to particular subscription service provider ("SSP") networks ("SSPN"), roaming agreements to allow connections from wireless clients associated with different SSPs, authentication capabilities to enable secure communications, support for emergency services or support for particular types of multi-media access (e.g., audio and/or video streaming, downloading, etc.). However, there is no expedited process for a mobile device to transition between networks. A mobile device may need to disconnect or disassociate with one network and authenticate/associate with a different network for the transition.

DETAILED DESCRIPTION

Figure 1:
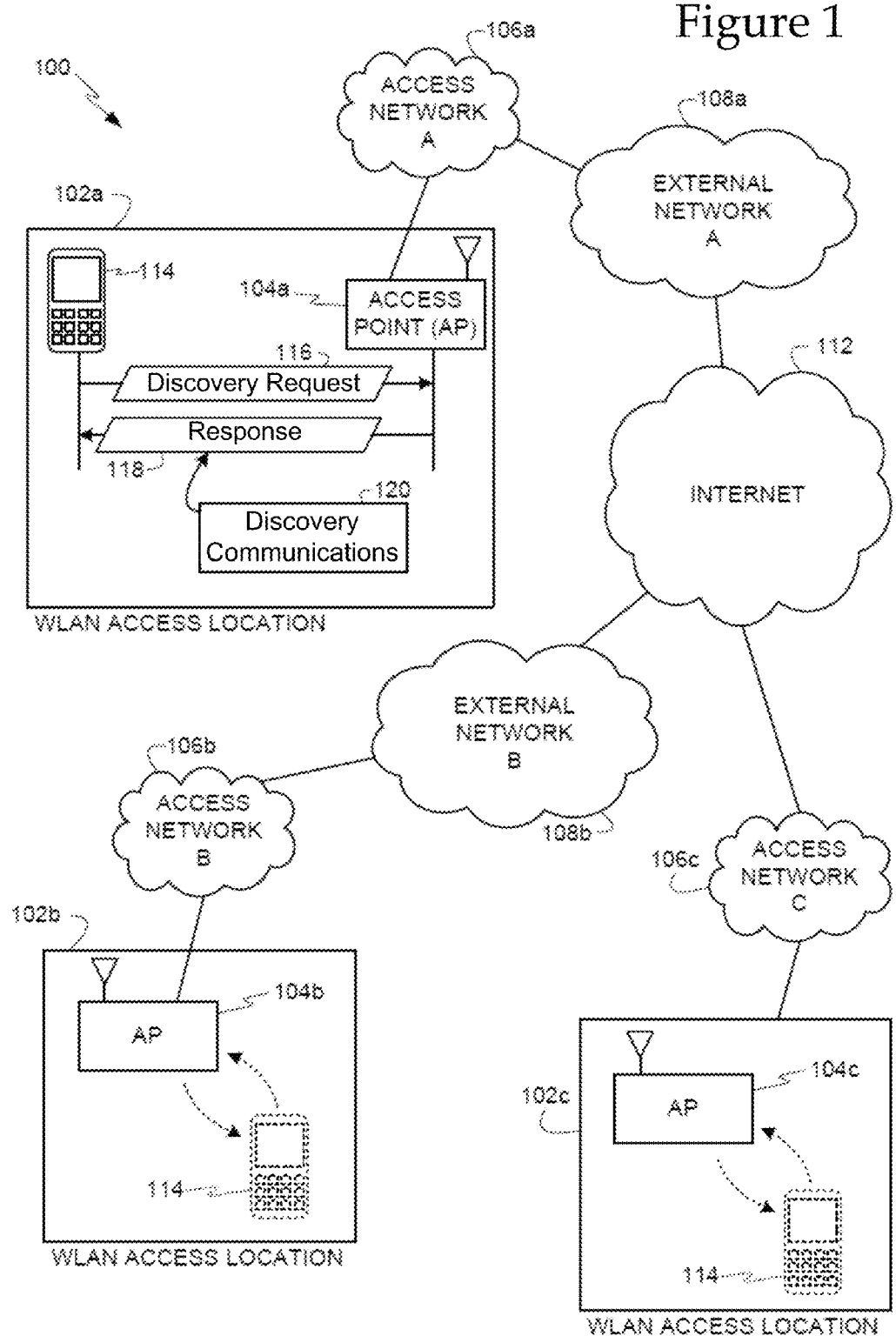
FIG. 1 illustrates a communication network.

The disclosed systems and methods allow mobile devices to transition between networks. The transition may occur seamlessly, such that a consumer never loses the network connection despite transitioning between networks. The communication for enabling a transition may comprise discovery information about a network prior to association with that network. This pre-association communication may be retrieved through a wireless protocol, such as Access Network Query Protocol ("ANQP"), which allows a mobile device to retrieve information about a network prior to associating with that network. Communications prior to network association may be referred to as discovery communications (i.e., communications that occur while a mobile device is in a pre-associated state). ANQP may allow a device to retrieve additional network information that can be used for transitioning between networks.

The seamless transition may be enabled through the creation and utilization of a central key holder authority that works across IEEE 802.11 Extended Service Sets ("ESSs"). The identity of the central key holder (i.e. key holder identity) may be advertised to an IEEE 802.11 mobile device in a pre-associated state. In other words, the key holder identity may be communicated with discovery communications, such as through ANQP messaging. The mobile device can use the key discovery communication along with a key generation method to assist the authentication and/or association with a network and whilst transitioning from one ESS to another.

There may be a common root key ("K") across ESSs. At each new access point ("AP") that the mobile device encounters, ESS and key holder identities may be discovered through discovery communications, including those available in neighboring APs. This information is available to the mobile device in a pre-associated state. A new IEEE 802.11 network layer key hierarchy that produces the common root key K across ESSs may allow fast authenticated ESS transitions for a mobile device.

The transitioning between networks and ESSs may be especially needed in an environment where mobile users are frequently entering and leaving the coverage area of an ESS. Every time the mobile device enters an ESS, the mobile device may do an initial link set-up to establish wireless local area network ("WLAN") connectivity. With the current IEEE 802.11 specification, initial authentication for a high number of users entering an ESS, may result in signaling overload in an authentication server. This may result in the local hotspot (e.g. an environment that is within communication range of WLAN signals) becoming exhausted of memory. For example, IEEE 802.11r provides a solution to allow a mobile device to transition between Basic Service Sets ("BSSs"), within the same mobility domain that restricts them to a single network (e.g. ESS). This may be equivalent to a mobile device moving from one WLAN to another, while remaining with the same network. The architecture of this IEEE 802.11 solution does not allow it to be scaled from local network (e.g. BSS) transition to network (e.g. ESS) transition, as the identity of the BSS is delivered in a different manner from that of the ESS. In addition, IEEE 802.11r assumes that security keys have a security association within a single ESS, to enable local network (e.g. BSS) transition.

A basic service set ("BSS") may be a set of stations ("STAs") that can communicate with each other. Each access point and its wireless devices may be known as a BSS. The BSS may include a STAs that have successfully synchronized using the JOIN service primitives and one STA that has used the START primitive. Membership in a BSS may not imply that wireless communication with all other members of the BSS is possible. According to the IEEE 802.11 standard a STA may be a mobile device, an access point "AP" or a mesh device "MSTA". Although not specified, the messages and protocols described below may be bi-directional and can flow from a mobile device to an AP and vice-versa. In infrastructure mode, a single AP together with all associated STAs is called a BSS. Every BSS has an identification (ID) called the BSSID, which may be the MAC address of the AP servicing the BSS. The simplest BSS may include one AP and one STA. There may be two types of BSS: 1) independent BSS (also referred to as IBSS); and 2) infrastructure BSS. An independent BSS ("IBSS") may be an ad-hoc network of STAs that contains no APs, which means they may not connect to any other basic service set.

A common distribution system ("DS") and two or more BSSs may create an extended service set ("ESS"). The ESS may be a set of one or more interconnected BSSs and integrated local area networks that appear as a single BSS to the logical link control layer at any STA associated with one of those BSSs. APs in an ESS are connected by a distribution system. The APs communicate amongst themselves to forward traffic from one BSS to another to facilitate movement of STAs between BSSs through the distribution system. The distribution system is the backbone of the wireless LAN and may be constructed of either a wired LAN or wireless network. The distribution system is a thin layer in each AP that determines the destination for traffic received from a BSS. The distribution system determines if traffic should be relayed back to a destination in the same BSS, forwarded on the distribution system to another AP, or sent into the wired network to a destination not in the extended service set. Communications received by an AP from the distribution system are transmitted to the BSS to be received by the destination mobile device.

Network equipment outside of the extended service set views the ESS and all of its STAs as a single MAC-layer network where all STAs are physically stationary. Thus, the ESS "hides" the mobility of the mobile devices from everything outside the ESS. In other words, components outside of the ESS need not be aware of or informed about the mobility of the mobile devices within the ESS. This level of indirection provided by the IEEE 802.11 architecture allows existing network protocols that have no concept of mobility to operate correctly with a wireless LAN where there is mobility. With ESS, the entire network may appear as an independent basic service set ("IBSS") to the Logical Link Control layer ("LLC"). Accordingly, STAs within the ESS may communicate or even move between BSSs transparently to the LLC. Each BSS may have an identity ("ID") called a service set identity ("SSID") which is a 32-byte (maximum) character string. As described below, the transition between networks may include a transition between ESSs through the use of a common root key ("K") that is transmitted during discovery communications. Also as described below, there may be an Extended Authentication Server ("EAS") that acts as a key holder for advertising the keys during discovery communications.

Mobile devices that communicate prior to network association and transition between networks (e.g. ESSs) may include mobile communication devices, mobile computing devices, or any other device capable of communicating wirelessly with a wireless network. Such devices may also be referred to as terminals, wireless terminals, mobile devices, stations ("STA") or user equipment, and may also include mobile smart phones (e.g., a BlackBerry® smart phone or BlackBerry® Playbook), wireless personal digital assistants ("PDA"), machine to machine equipment, equipment within a smart grid ("SmartGrid"), equipment within a mesh network (an ad-hoc or peer network), laptop/notebook/netbook computers with wireless adapters, etc.

Some mobile devices may transition between ESS networks, which may include a wireless local area network ("WLAN"). Network discovery and connectivity in a WLAN may occur through standards that define access, control and communications in networks, such as the communication standard known as IEEE® (Institute for Electrical and Electronics Engineers) 802.11, which, among other things, includes features describing "interworking with external networks." The "interworking" standard may be part of the IEEE 802.11-2012 base standard, and was formerly part of the amendment document IEEE 802.11u. Alternatively, the network discovery and connectivity may be subject to other parts of the IEEE 802.11 standard and other wireless communication standards including WLAN standards including any IEEE® 802.xx standard (e.g. IEEE 802.15, IEEE 802.16, IEEE 802.19, IEEE 802.20, and IEEE 802.22), personal area network standards, wide area network standards, or cellular communication standards.

One exemplary network may be a WLAN and is described below. Alternatively, the devices may discover information about other networks through other protocols and architectures, including a cellular network or a WiMax network. The network may comprise a publicly accessible network, such as the Internet, a private network, such as an intranet, or combinations thereof, and may utilize a variety of networking protocols now available or later developed including, but not limited to TCP/IP based networking protocols. The networks may include any communication method or employ any form of machine-readable media for communicating information from one device to another.

The transition between networks through discovery communications may be implemented in many environments providing WLAN access for network connectivity or in WLAN access locations or environments in which it may be expected that one or more users carrying respective mobile devices will associate with (i.e., join or connect to) and disassociate from a wireless network, AP, or WLAN as they enter and exit the WLAN access locations or environments.

In a WLAN environment, network discovery may include, for example, an active scan procedure or passive scan procedure performed by the mobile device. Typically, scanning procedures within a WLAN environment involve scanning for (i.e., determining) candidate STAs (e.g., mobile device, APs or mesh stations "MSTAs") with which the mobile device may associate with during an association procedure or re-associate with during a re-association procedure. In a passive scan procedure, a mobile device may "listen for" (i.e., receive or detect) beacon frames periodically transmitted from another STA (e.g., a mobile device, an AP or MSTA). In an active scan procedure, the mobile device generates one or more probe request frames. A STA (e.g., a mobile device, an AP or MSTA) that receives a probe request frame, in response, transmits a probe response frame. The mobile device then processes any received probe response frames.

In some WLAN environments, network discovery may further include an IEEE 802.11 authentication procedure. In other words, network discovery may include a successful authentication, an unsuccessful authentication, or a deauthentication of a mobile device with one of the STAs that were identified during the scanning procedure discussed above. Stated another way, network discovery may include: a transition of the mobile device from "State 1" to "State 2" based on a successful authentication of the mobile device; an unchanged state (i.e., remaining in "State 1") of the mobile device if authentication of the mobile device was unsuccessful; or a transition of the mobile device from "State 2" to "State 1" based on a deauthentication of the mobile device.

Some WLAN locations or environments may be known as "hotspots" in reference to a location or environment that is within communication range of WLAN signals. WLAN locations or environments may include coffee shops, retail stores, home locations (e.g. homes and apartments), educational facilities, office environments, airports, public transportation stations and vehicles, hotels, etc. Such WLANs are often implemented as access networks that provide access to publicly accessible networks and may be associated with, or support access to, external networks (or WLAN-supported networks) owned and/or operated by subscription-based service providers. For example, an external network can be owned and/or operated by an Internet-access service provider or a telecommunications carrier/service provider that provides subscription-based Internet access for a fee (e.g., a monthly fee). In some systems, a subscriber/user may subscribe to such a service can use wireless network access and/or Internet-access services based on such a subscription when the subscriber is in communication proximity of the WLAN with an appropriate mobile device. In some instances, different WLANs may provide access to different types of network information. For example, some WLANs may provide access to particular subscription service provider networks, and some WLANs may support roaming agreements to allow connections from mobile devices associated with different SSPs.

During some network discovery processes a mobile device may transmit a query for certain network information from the wireless local area network ("WLAN"). The terminal may obtain network information made available by WLANs to determine, based on the network information, whether to continue with a connection process to associate with that network.

In accordance with the embodiments described herein, mobile devices may request network information from WLANs using an Access Network Query Protocol ("ANQP"). ANQP supports information retrieval from an Advertisement Server that supports a Generic Advertisement Service ("GAS"). ANQP and GAS are defined in IEEE® 802.11u™ and also IEEE® 802.11-2012™, the entire disclosures of which are incorporated by reference.

Generic Advertisement Service ("GAS") may serve as a transport mechanism, at layer-2 (see e.g. FIG. 2), for an advertisement protocol such as ANQP. The advertisement protocol may connect the mobile device to one of several interworked servers. The advertisement protocol allows the transmission of frames between a mobile device and a server in the network prior to network connectivity. For example, GAS provides support for network selection by a mobile device as well as for communication between the mobile device and other information resources in the network before the mobile device associates with a WLAN. The mobile device may be connected to a layer-2 radio service, without exchanging any authentication parameters or without having a recognized session (because no session keys are established and no internet protocol "IP" address is assigned). When in compliance with the IEEE 802.11 standard, no data traffic is allowed in this state.

Other layer-2 transport mechanisms or even authentication mechanisms may be used. For example, the Extensible Authentication Protocol ("EAP") may be used to carry the advertisement protocol. The advertisement protocol information would be encapsulated within a suitable EAP-TLV (type length value) method frame (or alternative EAP method frame) and transported by the EAP. Use of secure credentials exchanged during the EAP transactions would also provide a level of security for any information carried within the advertisement protocol. For example, if EAP-SIM (or EAP-AKA) were to be the authentication protocol, any advertisement protocol information encapsulated (i.e. securely carried) within a suitable EAP-TLV frame during the same EAP transaction may also be protected by the SIM credentials.

Access Network Query Protocol ("ANQP") is an advertisement protocol and operates as a query and response protocol used by a mobile device to discover a range of information from a server including accessible roaming partners internet protocol address type availability, and other metadata useful in the mobile device's network selection process. ANQP is capable of discovering information about hotspots or wireless networks, prior to the mobile device establishing network connectivity and associating with that network. In addition to being defined in IEEE® 802.11u, additional ANQP messages may alternatively or additionally be defined in the Wi-Fi Alliance ("WFA") Hotspot 2.0 (also referred to as Passpoint) specifications. These ANQP extensions within the WFA Hotspot 2.0 specifications may be referred to as Hotspot ("HS") 2.0 ANQP elements. Alternatively, other advertisement protocols (e.g., Registered Location Query Protocol "RLQP" as defined in IEEE® 802.11af and Hotspot Registration Protocol "HRP" as defined in Wi-Fi Alliance Hotspot 2.0) may also be used. ANQP provides one embodiment for communication with a WLAN at the network discovery stage without requiring an association with the WLAN. Network information that is communicated prior to network association (or at the network discovery stage) is discussed below. In alternative embodiments, other layer-2 transport mechanisms or even authentication mechanisms such as the Extensible Authentication Protocol (EAP) could be used to carry the ANQP messages. The ANQP message would be encapsulated within a suitable EAP-TLV method frame (or alternative EAP method frame) and transported by the EAP.

A network discovery exchange may involve a requesting STA querying another STA (e.g., a mobile device, an AP or MSTA) for network information. A WLAN AP (also referred to simply as an AP) is an entity that contains one STA and provides access to distribution services via a wireless medium for associated STAs. The queried or receiving STA (e.g., a mobile device, an AP or an MSTA) may respond to the received query with the requested information in a response. The queried or receiving terminal can provide the response information with or without proxying the query to a server in an external network (e.g., a subscription service provider ("SSP") network). For example, an external network connected to a queried WLAN may have certain network information accessible via the WLAN and of which a querying mobile device may be made aware. The network discovery exchange or communications prior to network association may use ANQP or other query protocols too, just as information exchange services may be used alternatively.

FIG. 1 illustrates a communication network 100. Network information may be communicated during network discovery using ANQP over the communications network 100. The communication network 100 includes a plurality of WLAN access locations 102*a-c* having respective access points ("APs") 104*a-c* that provide access to respective access networks 106*a-c*. The APs 104*a-c* are further described with respect to FIG. 6. The access network A 106*a* provides access to an external network A 108*a* and the access network B 106*b* provides access to an external network B 108*b*. Unlike the access networks A 106*a* and B 106*b* that do not connect directly to the Internet 112, the access network C 110 may connect directly to a publicly accessible network like the Internet. Thus, the access network C 106*c* may be a public network, while the access networks A 106*a* and B 106*b* may be private networks. Any of the described networks may form part of an ESS.

In one embodiment, each of the external networks A 108*a* and B 108*b* may be a subscription service provider network ("SSPN") owned or operated by data subscription service providers, Internet subscription service providers, media (e.g., audio/video) subscription service providers, wireless communications subscription service providers, or any combination thereof. The external networks A 108*a* and B 108*b* are connected to the Internet 112 and may, for example, provide subscription-based Internet access to mobile device devices. In some implementations, roaming agreements between different subscription service providers may enable the external networks A 108*a* and B 108*b* to support roaming connections for mobile devices associated with other subscription service providers. In one embodiment, the external networks 108*a-b* are ESS networks. Alternatively, networks 106*a-c* may be ESS networks.

The WLAN access location 102a illustrates a mobile device 114 in wireless range of the access point ("AP") 104a. The mobile device 114 is further described with respect to FIG. 5. The AP 104a connects with the access network A 106a, which may provide a direct or indirect connection to other networks, including publicly accessible network like the Internet 112. Prior to the mobile device 114 associating with the access network A 106a, mobile device 114 sends a discovery request 116 to the AP 104a. The AP 104a may respond with a discovery response 118. In alternative embodiments, the discovery request 116 may originate from the AP 104a and the discovery response 118 may be from the mobile device 114, such as with mesh, peer to peer, ad-hoc or Wi-Fi direct networks. The discovery request 116 or the discovery response 118 may include discovery communications 120. The discovery communications 120, also known as network information, discovery information, or network discovery information, may include information about the network and/or device that is communicated between the device and the network prior to the device associating with the network. Accordingly, the discovery communications 120 may be referred to as pre-association communications or pre-association information. In one embodiment, the discovery communications 120 may be communicated using the ANQP protocol.

The discovery communications (request 116 and response 120) may be exchanged at a media access control ("MAC") sub-layer of a data link layer of the Open Systems Interconnection ("OSI") Reference Model without needing to use operations at or above an internet protocol ("IP") layer (i.e., a network layer) and without needing to otherwise provide access to the IP layer while discovering discovery communications 120. Discovering network information using messages exchanged at or above the network layer may require more processing power for a mobile device than implementing processes at the MAC sub-layer. The layers in which the discovery communication occurs are further illustrated in FIG. 2.

Each of the APs 104a-c and the mobile device 114 may include a network adapter or network interface card that facilitates connections to a wireless medium. The network interface component may be referred to as a station ("STA"). Each of the access networks 106a-c and the external networks 108a-b may be associated with one or more ESSs and a key holder identifier may be provided to mobile devices 114 prior to the association with a network.

The mobile device 114 may associate with different APs (e.g., the APs 104a-c) based at least partially on the discovery communications 120 received regarding the available external networks. The mobile device 114 may receive information from the APs when moved in range of one of the WLAN access locations 102a-c, respectively. The information received may be discovery communications prior to association that include information about the particular BSS or ESS for the networks. The information received may be utilized when transitioning between networks.

Figure 2:
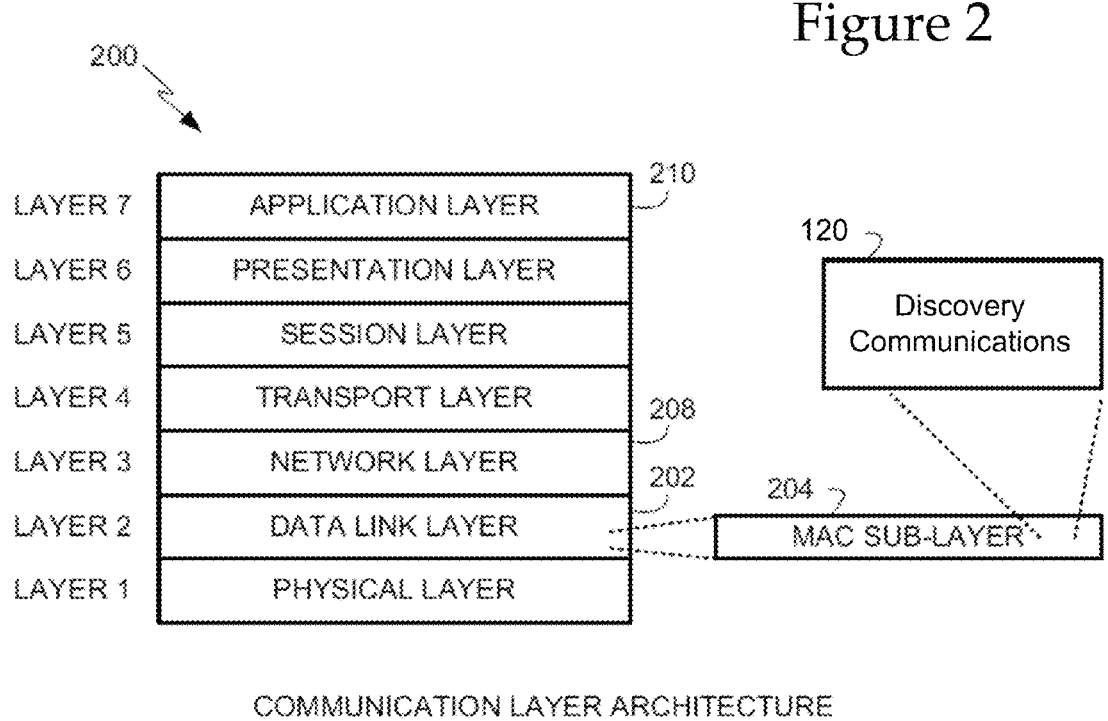
FIG. 2 illustrates a communication layer architecture.

FIG. 2 illustrates a communication layer architecture 200. The communication layer architecture 200 includes seven layers which may be implemented in accordance with the Open Systems Interconnection ("OSI") Reference Model. The communication layer architecture 200 includes a data link layer 202, which includes a media access control ("MAC") sub-layer 204. Mobile devices (e.g., the mobile device 114 of FIG. 1) may provide network information or discovery communications 120 (e.g. the discovery request 116 and the discovery response 118) with wireless access points (e.g., the APs 102a-c of FIG. 1) at the MAC sub-layer 204. A mobile device may access information from a memory or other hardware of the mobile device at the MAC sub-layer 204 without needing to perform operations at or above an internet protocol layer (e.g., a network layer 208) and without needing to provide access to the internet protocol layer. Mobile devices (e.g., the mobile device 114 of FIG. 1) that include mobile smart phones, PDA's, processor based devices, etc. may have relatively limited processor cycles and less available electrical power than fixed-location computing devices powered using wired (e.g. alternating current) electricity sources. Low-level resource operations at the MAC sub-layer require relatively fewer system resources than user-interface-intensive and operating system intensive operations (e.g., web-browser operations) at an application layer.

Some communications or authentication techniques that use hypertext transfer protocol ("HTTP") or other internet protocol processes may require establishing a connection between a mobile device and a wireless access point at one or more of the layers between and including the network layer 208 and an application layer 210 of the communication layer architecture 200. In these applications, discovery communications 120 may not require a connection or access to the network layer 208 or any layers within a protocol suite. An inclusion of a discovery communication 120 on the MAC sub-layer 204 may allow for a mobile device to communicate with a network without associating with the network.

Discovering network information available via access points using the MAC sub-layer may be used for identifying the BSS and/or ESS associated with a particular AP. As described below in FIGS. 3-4, the ESS information may be used by a mobile device to transition seamlessly between different networks associated with different ESSs. The discovery communications 120 may indicate whether a particular network (e.g., a SSPN) has the extended capability for improved transitions between ESS networks. An indication of that capability may be a particular bit added to the Extended Capability information element ("IE") that indicates the ability to utilize a key K for faster transitions between ESS networks. As described below, the particular bit may be referred to as a Fast Initial Link Setup ("FILS") bit and may be a part of discovery communications prior to association. The FILS bit may indicate whether the extended capability for expedited transitions is possible. Further, the discovery communications may include a key holder identifier that is advertised to mobile devices to allow those terminals to determine when ESS networks have access to the same key. The key may be derived at the mobile device through an algorithm which eliminates the need to transmit the key.

Figure 3:
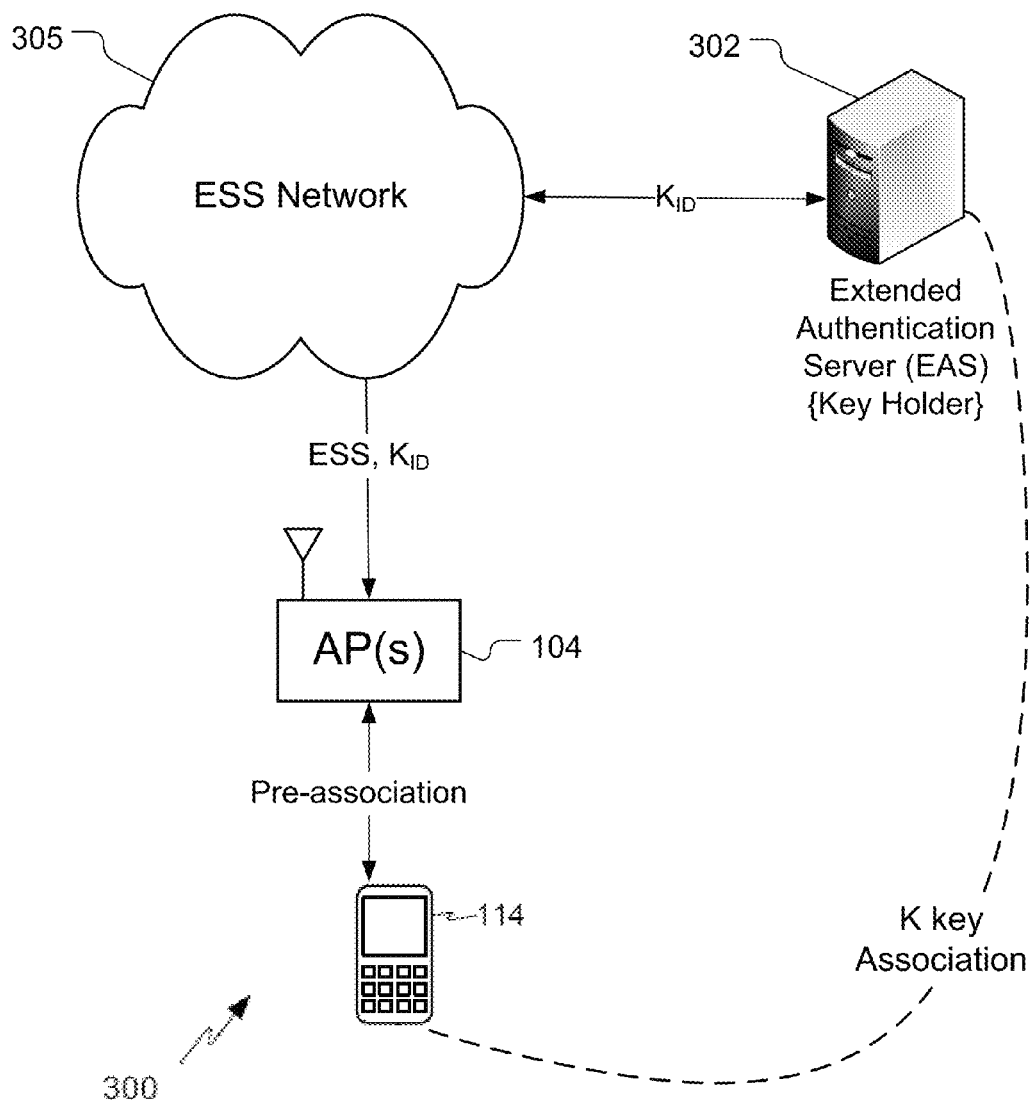
FIG. 3 illustrates an alternative communication network.

FIG. 3 illustrates an alternative communication network 300. In particular, the network 300 illustrates the communication between the mobile device 114, the AP 104, and an ESS network 305. An Extended Authentication Server ("EAS") 302 may be the key holder that provides the key identification to be used, by the AP 104, during pre-association communications. The EAS 302 may be implemented as hardware and/or software. In one embodiment, the EAS 302 may be an additional hardware device that communicates with the ESS network 305. Alternatively, the EAS 302 may be software that runs on existing hardware in communication with the ESS network 305. Exemplary existing hardware that may operate as the EAS 302 may include a maintenance server and/or a billing server that are configured (through software) to act as the EAS 302. The EAS 302 may be an authentication mechanism that covers multiple networks over a large area. For example, an EAS 302 may cover a small city or county. The ESS network 305 may advertise, via the AP 104, the EAS 302 to the mobile devices 114 that the ESS network 305 is associated with. In particular, as the EAS 302 may be the key holder, its identity, referred to as "$K_{ID}$", may be advertised or broadcast.

Upon initial entry into the network 305, the mobile device 114 discovers the identity of a key holder "$K_{ID}$" from AP 104 (as advertised by the AP 104 in pre-association communications) together with identity of the ESS itself. The $K_{ID}$ may be implemented to identify the K key holder, which is the EAS 302 in the example shown in FIG. 3. AP 104 may advertise or broadcast (to mobile devices, such as the mobile device 114) the identity of the K key holder $K_{ID}$. A new ANQP-message or field may be utilized to allow advertisement of the $K_{ID}$. Once the mobile device 114 detects the Fast Initial Link Setup ("FILS") bit within the broadcasted Extended Capabilities IE from the AP, the mobile device 114 may then retrieve the $K_{ID}$ using this new ANQP-message or field.

The $K_{ID}$ may be the address of the EAS and may also be referred to as the Fast Initial Link Setup ("FILS") identity. FILS may refer to mechanisms for improving the initialization and association of devices with wireless networks. In this case, the transition between networks is fast and seamless because of the key identification. In particular, if the ESS 305 is the network that the mobile device 114 wishes to connect to, a "K" key security association is established between the mobile device 114 and the EAS 305 by an authentication sequence (examples of which are described with respect to FIGS. 7-8).

At each new AP 104 that the mobile device 114 encounters, ESS 305 and key holder identities may be discovered through discovery communications (e.g. using a new ANQP-message or field). A new ESS level key ("K") is created at the ESS (network) level and may then be used as a symmetric key between the mobile device 114 and the EAS 302 that the mobile device 114 connects to. The K key may be derived from the IEEE 802.11u HESSID identifier used to identify homogeneous ESSs (e.g. ESSs that share some sort of relationship). The K key may also be derived by an authentication sequence between the mobile device 114 and the EAS 302, with the IEEE 802.11u HESSID being used to identify the EAS 302 in one example. An existing IEEE 802.11 parameter such as the HESSID (or FQDN or other new network identifier) may be used to carry the $K_{ID}$ parameter. Once the mobile device 114 detects the FILS bit within the broadcast Extended Capabilities IE from the AP, the mobile device 114 may directly use the HESSID parameter. The HESSID parameter and FILS bit may also broadcast from the AP. If the HESSID is not being used as the $K_{ID}$, then another ANQP-message may be used to retrieve it.

The EAS 305 maintains the K key and the $K_{ID}$ (the address of the EAS) becomes the identity of the K key holder. As described, the AP 104 advertises (through discovery communications) the $K_{ID}$ before association with the network. Mobile devices may then utilize the $K_{ID}$ information that is transmitted before network association to transition between networks with the same $K_{ID}$.

Extended authentication request and response messages may be generated to allow the K key to be transported from the device to an AP, to allow a more efficient authentication mechanism when transitioning from one ESS to another. The extended messages may include an extra bit that is added to the advertised Extended Capability information element ("IE"). The extra bit may indicate that ESS transitioning using the K key is enabled. The Extended Capability IE may be returned to a mobile device by an AP in a probe response with a single bit set within this IE to indicate ESS transitioning support.

Figure 4:
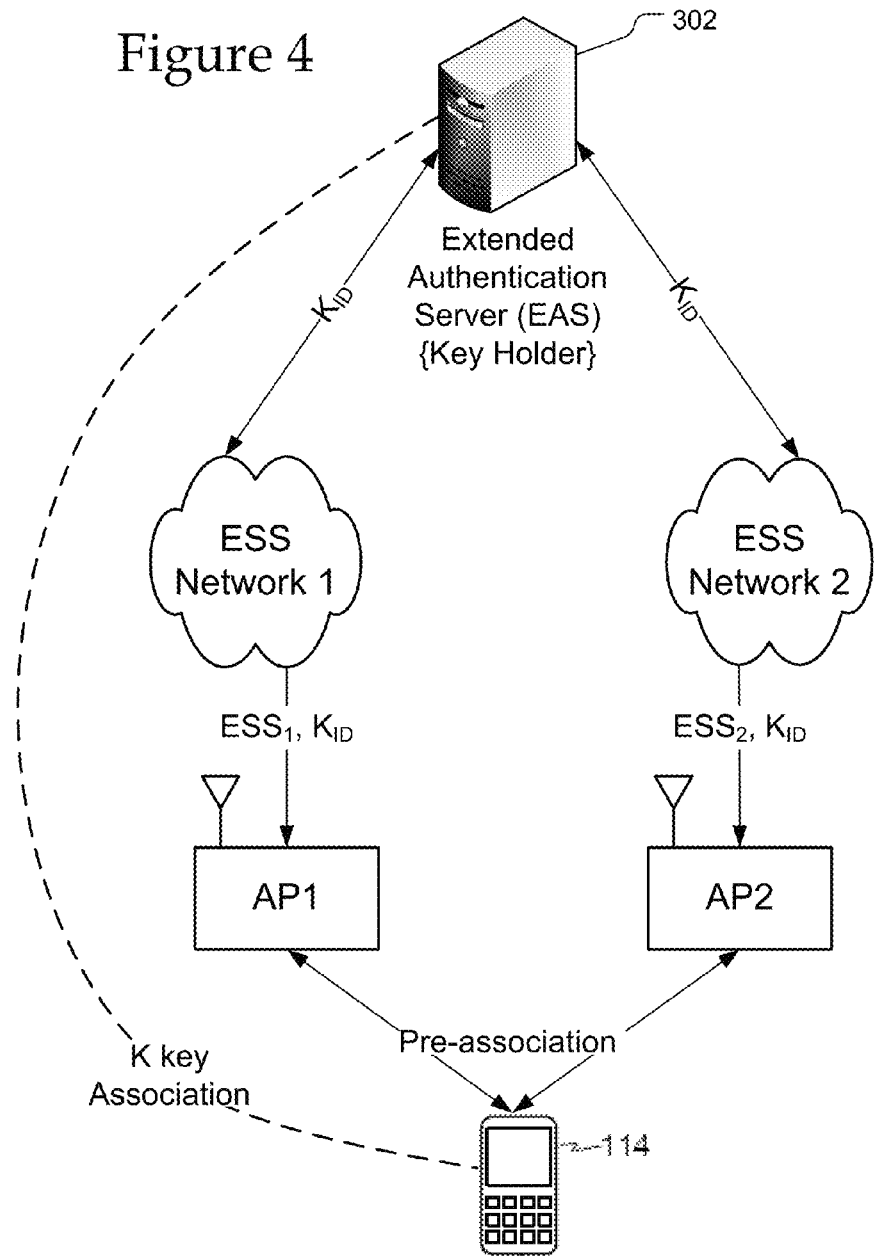
FIG. 4 illustrates another alternative communication network.

FIG. 4 illustrates another alternative communication network. In particular, FIG. 4 shows that the mobile device 114 can use the K key to perform an expedited authentication (e.g. a Fast Initial Link Setup "FILS") with another access point AP2 that is connected to a different ESS network (ESS2), advertising the same $K_{ID}$ (i.e. the address of the same EAS 302 as shown in FIG. 3). The expedited authentication may be beneficial as it is faster than conventional authentication, due to the fact that the presence of the K key and $K_{ID}$ implies an existing security association between the mobile device 114 and the access network AP2. In other words, assuming that the mobile device 114 has previously connected with the first access network AP1, the mobile device 114 will know the $K_{ID}$ and have already established a security association with the EAS with the K key. Then, if the mobile device 114 has discovery communications (pre-association) with the second access point AP2, the $K_{ID}$ will be transmitted to the mobile device 114 during the discovery communications. Since the EAS 302 and K key cover both the ESS1 and ESS2 networks, the mobile device 114 can quickly transition to the second access point AP2 network because of the prior security association. The EAS 302 providing the $K_{ID}$ and the K key association with the mobile device 114 allows for fast transitions between any ESS networks associated with that EAS 302.

Figure 5:
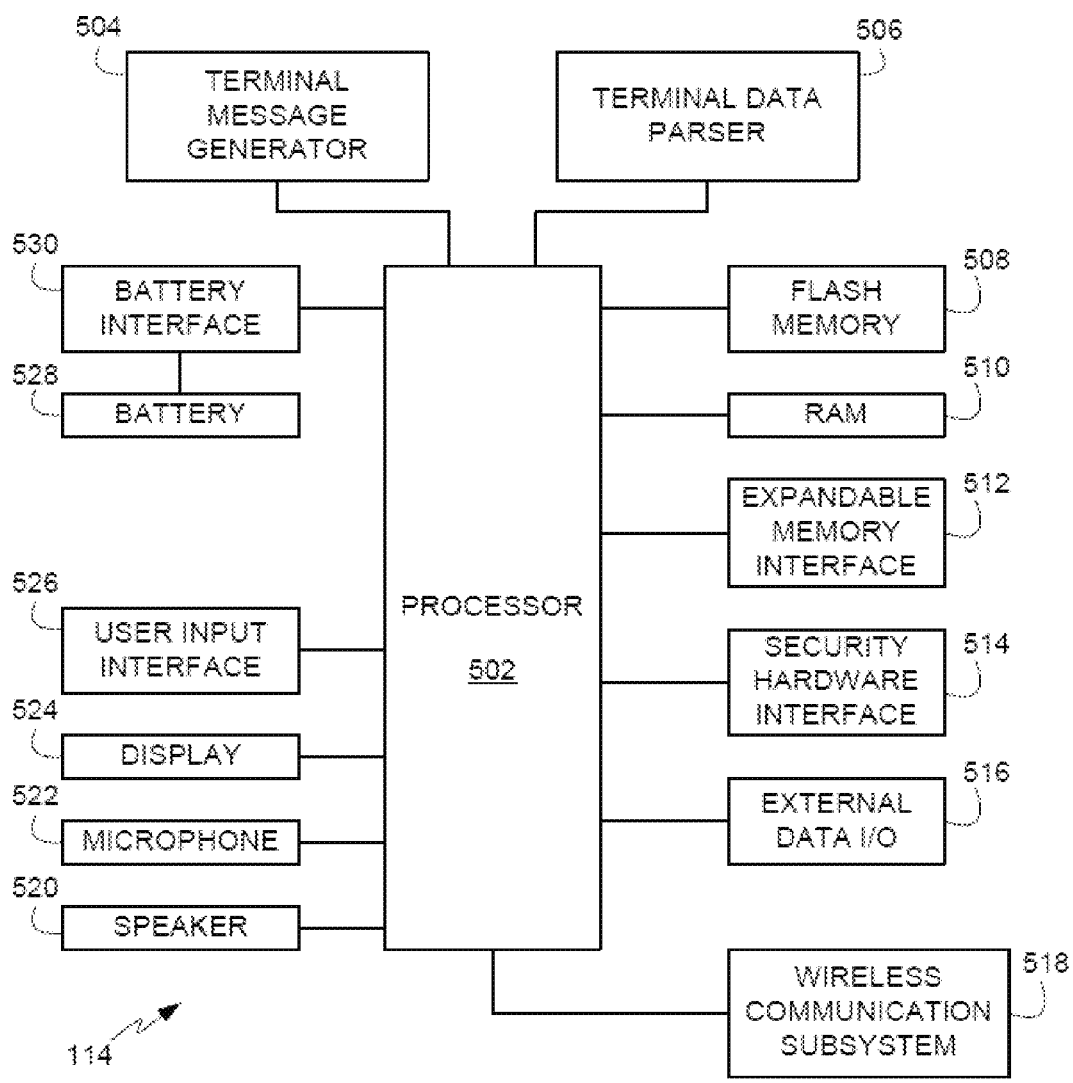
FIG. 5 illustrates a mobile device ("STA")

FIG. 5 illustrates a mobile device 114 as shown in FIGS. 1, 3, and 4. The mobile device 114 includes a processor 502 that may be used to control the overall operation of the mobile device 114. The processor 502 may be implemented using a controller, a general purpose processor, a digital signal processor, dedicated hardware, or any combination thereof. The processor 502 may include a central processing unit, a graphics processing unit, a digital signal processor or other type of processing device. The processor 502 may be a component in any one of a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may operate in conjunction with a software program, such as code generated manually (i.e., programmed).

The mobile device 114 also includes a terminal message generator 504 and a terminal data parser 506. The terminal message generator 504 may generate network information discovery messages such as the discovery request 116 and discover response 118 for communicating the network information 120 from FIG. 1. The terminal data parser 506 may be used to retrieve network information from memory (e.g., random access memory 510, etc.). For example, the terminal data parser 506 may retrieve network information 120 that is cached in the mobile device 114 after receipt from a WLAN (e.g., the access networks 106a-c of FIG. 1).

In the illustrated embodiment, the terminal message generator 504 and the terminal data parser 506 are shown as separate from and connected to the processor 502. In alternative embodiments, the terminal message generator 504 and the terminal data parser 506 may be implemented in the processor 502 and/or in a wireless communication subsystem (e.g., a wireless communication subsystem 518). The terminal message generator 504 and the terminal data parser 506 may be implemented using any combination of hardware, firmware, and/or software. For example, one or more integrated circuits, discrete semiconductor components, and/or passive electronic components may be used. For example, the terminal message generator 504 and the terminal data parser 506, or parts thereof, may be implemented using one or more circuits, programmable processors, application specific integrated circuits, programmable logic devices, field programmable logic devices, etc.

The terminal message generator 504 and the terminal data parser 506, or parts thereof, may be implemented using instructions, code, and/or other software and/or firmware, etc. stored on a machine accessible medium and executable by, for example, a processor (e.g., the processor 502). The terminal message generator 504 or the terminal data parser 506 may be stored on or include a tangible storage medium or memory. For example, the terminal message generator 504 or the terminal data parser 506 may be implemented in software stored on a memory that is executable by the processor 502. Alternatively, the terminal message generator 504 and/or the terminal data parser 506 may be implemented in hardware with software functions. The memory for storing software associated with the terminal message generator 504 and/or the terminal data parser 506 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. In one embodiment, the memory may include the random access memory 510 for the processor 502, or may be an external storage device or database for storing recorded ad or user data. Examples include a hard drive, compact disc ("CD"), digital video disc ("DVD"), memory card, memory stick, floppy disc, universal serial bus ("USB") memory device, or any other device operative to store user data. The memory is operable to store instructions executable by the processor 502.

The mobile device 114 may include a FLASH memory 508, a random access memory 510, and/or an expandable memory interface 512 coupled with the processor 502. The FLASH memory 508 may store computer readable instructions and/or data. In some embodiments, the FLASH memory 508 and/or the RAM 510 may store the network information 120 from FIG. 1 and instructions for communicating that network information 120. The processor 502 may be coupled with the memory (e.g. the FLASH memory 508, or the RAM 510) for storing software instructions executable by the processor 502. The memory may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The functions, acts or tasks illustrated in the figures or described herein may be performed by the programmed processor 502 executing the instructions stored in the memory. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The mobile device 114 may include a security hardware interface 514 to receive a SIM card from a wireless service provider. A SIM card may be used for network discovery communications including authentication of the mobile device 114 for establishing a connection with a WLAN-supported network. The mobile device 114 may be provided with an external data I/O interface 516. The external data I/O interface 516 may be used by a user to transfer information to the mobile device 114 through a wired medium.

The mobile device 114 may include wireless communication subsystem 518 to enable wireless communications with access points (e.g., the APs 104a-c of FIG. 1). Although not shown, the mobile device 114 may also have a long-range communication subsystem to receive messages from, and send messages to, a cellular wireless network. In the illustrated examples described herein, the wireless communication subsystem 518 can be configured in accordance with the IEEE® 802.11 standard. In other example implementations, the wireless communication subsystem 518 may be implemented using a BLUETOOTH® radio, a ZIGBEE® device, a wireless USB device, an ultra-wideband radio, a Near Field Communications ("NFC") device, or a Radio Frequency Identifier ("RFID") device.

The mobile device 114 may include a user interface for communicating with the mobile device. The user interface may be separate component or it may include a speaker 520, a microphone 522, a display 524, and a user input interface 526. The display 524 may be a liquid crystal display, an organic light emitting diode, a flat panel display, a solid state display, a cathode ray tube, a projector, a printer or other now known or later developed display device for outputting determined information. The user input interface 526 may include alphanumeric keyboard and/or telephone-type keypad, a multi-direction actuator or roller wheel with dynamic button pressing capability, a touch panel, etc. The network discovery information that is communicated with a network prior to connection may be communicated with or without each of the user interfaces described herein. The speaker, 520, the microphone 522, the display 524, the user input interface 526, and/or any combination thereof may be omitted in alternative embodiments. In one embodiment, the mobile device 114 is a battery-powered device and includes a battery 528 and a battery interface 530.

Figure 6:
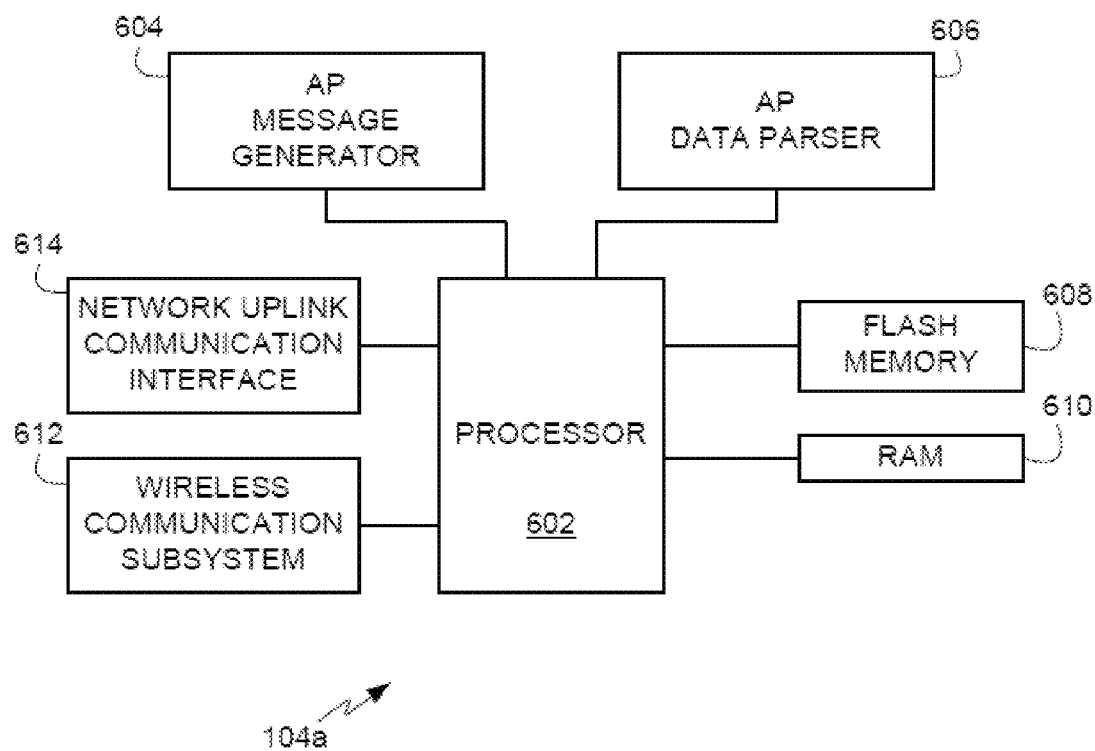
FIG. 6 illustrates an access point.

FIG. 6 illustrates an access point ("AP") 104a. The access point shown in FIG. 6 is AP 104a, but may also be illustrative of other access points (e.g. APs 104b, 104c). AP 104a includes a processor 602 to perform operations of the AP 104a. The processor 602 may be similar to the processor 502 described above.

The AP 104a includes an access point message generator 604 to generate network information communications and an access point data parser 606 for retrieving network information communications from the mobile device 114 and/or the external network A 108a as illustrated in FIG. 1. The access point message generator 604 may be similar to the terminal message generator 504 of FIG. 5, and the access point data parser 606 may be similar to the terminal data parser 506 of FIG. 5. As with the terminal message generator 504 and the terminal data parser 506 of FIG. 5, the access point message generator 604 and the access point data parser 606 may be implemented in software stored on a memory that is executable by the processor 602 or may be implemented in hardware with software functions executed by the processor 602. Alternatively, the access point message generator 604 and the access point data parser 606 may be implemented in a wireless communication subsystem (e.g., a wireless communication subsystem 612) using any combination of hardware, firmware, and/or software including instructions stored on a tangible computer readable medium and/or a non-transitory computer readable medium.

The AP 104a may also include a FLASH memory 608 and a RAM 610, both of which are coupled to the processor 602. The FLASH memory 608 and/or the random access memory ("RAM") 610 may be configured to store network information (e.g., network information 120 including discovery communications from FIG. 1). The RAM 610 may also be used to generate messages for communication with the mobile device 114 and/or to the external network A 108a. The RAM 610 may also store received messages communicated by the mobile device 114 and/or the external network A 108a.

To communicate with mobile devices such as the mobile device 114, the AP 104a may include a wireless communication subsystem 612, which may be similar to the wireless communication subsystem 518 of the mobile device 114 illustrated in FIG. 5. To communicate with a WLAN-supported network or external network (e.g., the networks 106a-c, 108a, and 108b of FIG. 1), the AP 104a may include a network uplink communication interface 614.

Figure 7:
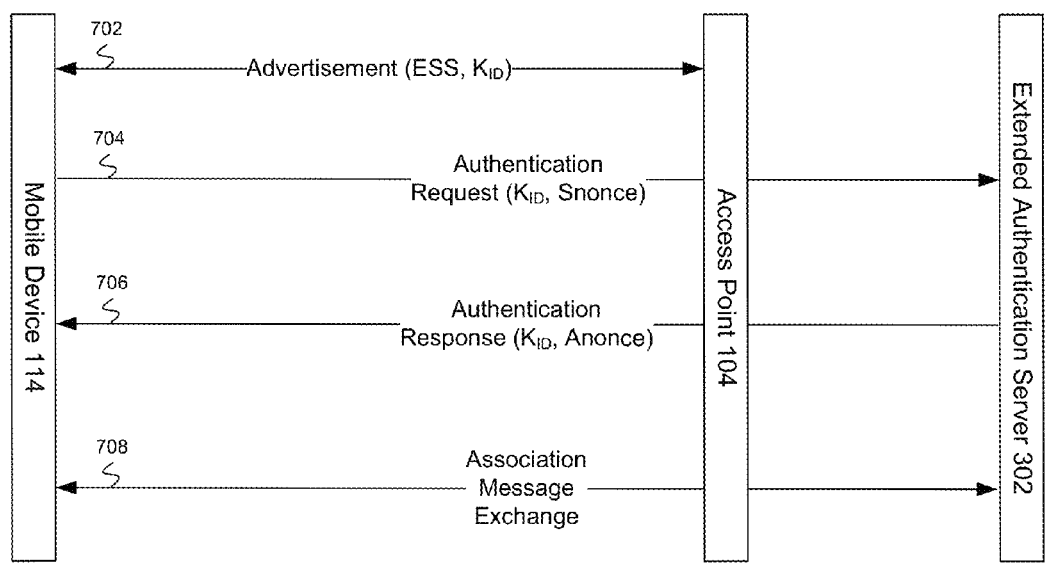
FIG. 7 illustrates key authentication.

FIG. 7 illustrates key authentication. In particular, FIG. 7 shows an example initial authentication sequence where the ESS (network) level K key is derived between a mobile device and an EAS. In one embodiment, the $K_{ID}$ may have no relationship to the K key itself. The K key may be derived using a pseudo-random function (e.g. the IEEE 802.11r KDF) based on a hash of elements that may include the mobile identity (MAC address), the EAS Identity, a mutually derived key based on the result of mutual authentication during the initial association process, supplicant Nonce "SNonce" (e.g. from the mobile device), authenticator Nonce "ANonce" (e.g. from the EAS), and the SSID of the ESS where the mobile initially connected. A Nonce may be a random number that is not repeated, such as the date and time.

In message 702, the advertisement of the ESS identity and the EAS identity ($K_{ID}$) provides the mobile device 114 with parameters that are related to the network to which the AP is connected. The advertisement may be performed during discovery communications while the mobile device 114 is in a pre-associated state. In block 704, an authentication request is sent from the mobile device 114 to the EAS 302. The authentication request may include the $K_{ID}$ along with an SNonce variable. In message 706, the authentication response is sent to the mobile device 114 from the EAS 302. The authentication response may include the $K_{ID}$ along with an ANonce variable. In message 708, an association message exchange may occur. The association message exchange may occur between the mobile device 114 and the EAS 302 resulting in the generation of the key K value. In one embodiment, the key K is not transmitted for security reasons, rather the key K is generated (e.g. derived or calculated) mutually by the mobile device 114 and the EAS 302. In another embodiment, the key K is not transmitted for security reasons, rather the key K is generated asymmetrically by the EAS 302 using an identity of the mobile device 114. In another embodiment, the K key has a lifetime. When the lifetime of K expires, the mobile device may re-run the initial authentication sequence (with the same EAS 302 or a new EAS) to generate a new K key. This new K key will be different from the old one, as SNonce and ANonce have different values.

Figure 8:
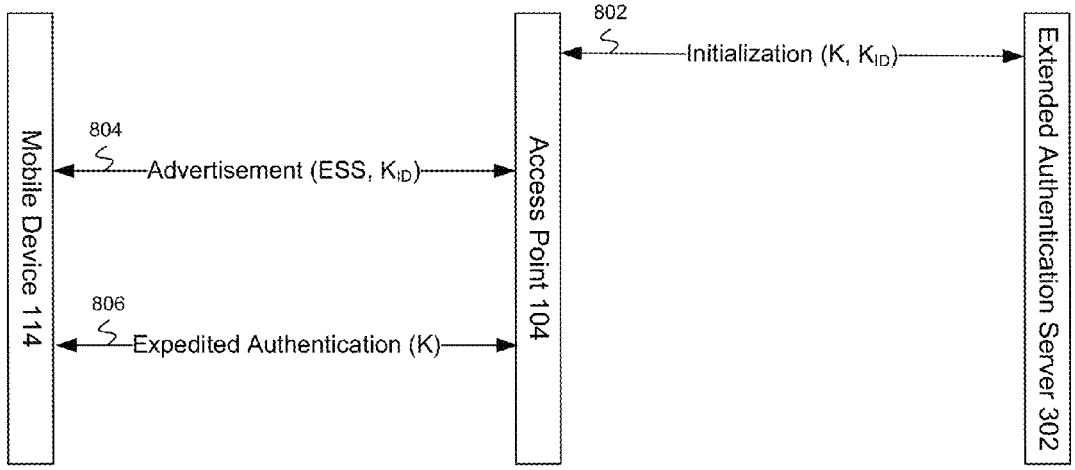
FIG. 8 illustrates device authentication.

FIG. 8 illustrates device authentication. As illustrated in FIG. 8, the messages may be related to the expedited transition and authentication of the mobile device 114 with a second access point 104 and a second ESS network after previously authenticating with a first access point 104 and a first ESS network associated with the same EAS 302. In other words, FIG. 8 illustrates the communications between the EAS 302, ESS Network 2, AP2, and the mobile device 114 as illustrated in FIG. 4.

The messages in FIG. 8 include an initialization message 802 between the access point 104 and the EAS 302. The initialization message 802 may allow the AP to have both the K key and $K_{ID}$, before the mobile device 114 comes into radio range of the ESS network. It is also possible to split this message into two parts so that the $K_{ID}$ can be delivered to AP 104 at system initiation, and then the K key may be delivered once it has been derived as the mobile device enters the ESS network range. Accordingly, the $K_{ID}$ can be advertised to the mobile devices 114 from the AP 104 through the advertisement message 804. The advertisement message 804 may be performed using a probe request or a probe response between the mobile device 114 and the AP 104. Alternatively, ANQP messages may be sent from the mobile device 114 to the AP 104. In this message the identity of the ESS to which the AP 104 is connected (ESS) and the identity of the K Key holder ($K_{ID}$) may be transmitted to the mobile device 114. The mobile device 114 receives the ESS and/or $K_{ID}$ and knows whether an expedited authentication is possible. In particular, if the mobile device 114 has already authentication with the same $K_{ID}$, then expedited authentication is possible for the other ESSs associated with that key holder (i.e. the EAS is the same). The expedited authentication sequence 806 may then occur. The authentication sequence may take place between the mobile device 114 and the access point 104. The EAS may need to pass the key K to the access point 104, prior to the initial authentication sequence.

Figure 9:
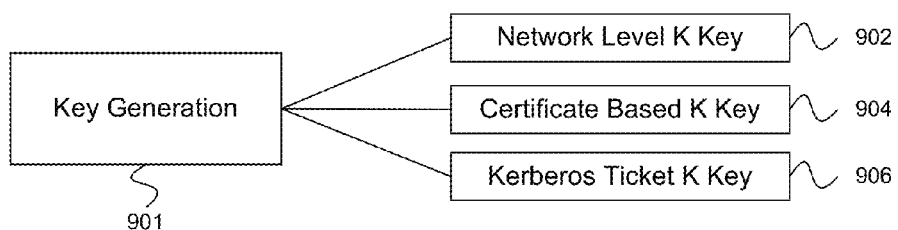
FIG. 9 illustrates key generation.

FIG. 9 illustrates key generation 901. In particular, the key generation 901 may occur at the individual devices (e.g. the mobile device 114 and the EAS 302) so that the key K does not need to be communicated. The local key generation 901 may be performed through an an algorithm that utilizes certain information, such as the $K_{ID}$ and appropriate Nonces, to generate the key K. The generation of the K key may result from a symmetrical algorithm operating between individual devices (mutual) or an asymmetric algorithm operating in one device only. The key generation 901 may include network level K key 902, certificate based K key 904, and/or Kerberos ticket K key 906.

The certificate based K key 904 may be derived from a certificate delivered by a Root Certificate Authority that has a trust relationship with the mobile device and the EAS. The type of certificate may be insignificant. In this case, the mobile device 114 may have to perform an initial out of band ("OOB") enrolment protocol with the EAS (potentially using GAS or some other protocol) to initialize its certificate. Each access point may also have a certificate derived from the same Root Certificate Authority. An alternative is that a manufacturer's certificate may be used, although this may be difficult to revoke if the security of the mobile device is compromised. Once the mobile device 114 has a certificate, either an asymmetric or symmetric algorithm (e.g. Diffie-Hellman) exchange may be used between it and the EAS to derive a public/private K key pair, which is used for authentication as the mobile device 114 moves between ESSs. The lifetime of the derived private key may be difficult to manage when using a certificate based K key 904.

The Kerberos ticket K Key 906 may be derived when the mobile device 114 authenticates with an initial ESS for the first time. The K key itself may not be passed over the air. Rather mathematical parameters which allow the K key to be derived may be passed. Although, this initial transaction may be rather slow, subsequent transactions may be much faster. An exemplary process for a mobile device 114 may include: 1) an initial login using IEEE 802.1X (authenticate); 2) obtaining a Kerberos ticket (enrollment process); 3) re-authenticate (when necessary) to a new hotspot using the Kerberos ticket; and 4) perform an online signup to establish more permanent credentials. Kerberos tickets may be time limited, for example, to only multiple hours. If the Kerberos Server is located on the same realm (advertised by $K_{ID}$) as the EAS (see FIG. 4), then the mobile device 114 may perform expedited authentication and association as it transitions between each ESS.

Figure 10:
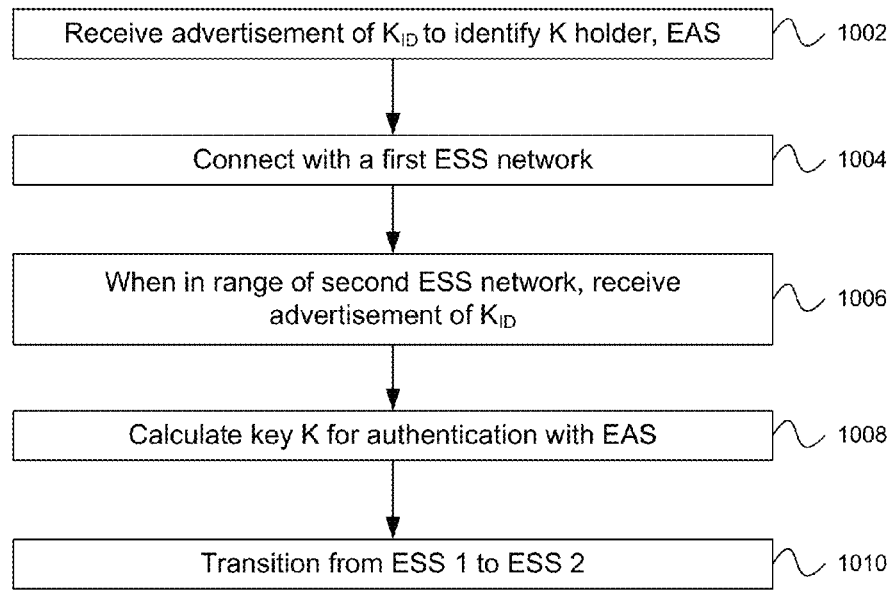
FIG. 10 illustrates a process for generating and utilizing a key.

FIG. 10 illustrates a process for generating and utilizing a key for transitioning between ESS networks. In block 1002, a mobile device may receive an advertisement of a key holder identity $K_{ID}$ from a particular network. The key holder may be an EAS that provides the key holder identity to a number of ESS networks. The advertisement may be a discovery communication prior to network association and may be an ANQP communication. In block 1004, the mobile device may connect with or associate with a first ESS network associated with the EAS. The association may include an authentication process in which the mobile device is authenticated to access the network. When within range of a second ESS network, the device may receive an advertisement from the second ESS network that includes the same key holder identity $K_{ID}$ that was advertised from the first ESS network as in block 1006. The receipt of the advertisement form the second ESS network may occur after the mobile device has left the first ESS network, or it may occur while the mobile device is still associated with the first ESS network. The advertisements of the key holder identity $K_{ID}$ may include an identifier of the particular ESS network (e.g. ESS1 or ESS2).

Since the mobile device has already authenticated with a related ESS network (ESS1, which is related because of the common security association with EAS), there may be an abbreviated or expedited authentication. This expedited authentication process may also be referred to as a seamless or expedited transition between ESS networks. In block 1008, the key K may be derived on the mobile device as described with respect to FIG. 9. Once the K key is derived, the mobile device may transition from the first ESS network to the second ESS network.

Figure 11:
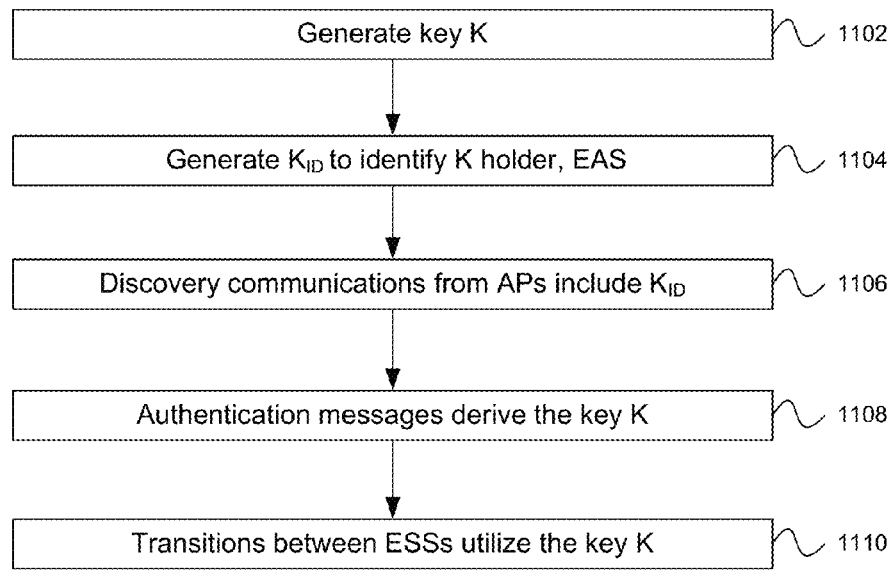
FIG. 11 illustrates another process for generating and utilizing a key for transitioning between ESS networks.

FIG. 11 illustrates another process for generating and utilizing a key for transitioning between ESS networks. In block 1102, the key may be generated. As described above, the key may be generated at the mobile device and/or the EAS without passing the key over a network. In block 1104, a key holder identifier $K_{ID}$ that is used to identify the key holder may be generated. As described, the $K_{ID}$ may identify the EAS for one or more ESS networks. In block 1106, discovery communications from the access points are advertised that include the $K_{ID}$. In addition to identifying the key holder identity (EAS, $K_{ID}$), the discovery communications may also identify the ESS for the particular access point. In block 1108, authentication messages may be derived based on the generation of the key K at the mobile device and at the EAS. The authentication may include a verification at the mobile device and/or the EAS that the key was properly generated. In one embodiment, this verification may occur without any authentication messages being transmitted. In block 1110, the mobile device may transition between ESS networks. When those networks are connected with the same EAS the transition may be expedited in part because the K key is already know. The expedited transition may be utilized when the mobile device recognizes the $K_{ID}$ that is advertised.

The system and process described may be encoded in a signal bearing medium, a computer readable medium such as a memory, programmed within a device such as one or more integrated circuits, and one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method for:
  receiving, by a mobile device, from a first Extended Service Set ("ESS") network of a plurality of ESS networks, an identifier for a common key holder associated with each of the plurality of Extended Service Set ("ESS") networks;

using, by the mobile device, a common key derived from the identifier to authenticate the mobile device with the first ESS networks;

receiving, by the mobile device, from a second ESS network of the plurality of ESS networks, the identifier for the common key holder associated with each of the plurality of Extended Service Set ("ESS") networks; and transmitting, from the mobile device, a message to the second ESS network, wherein the mobile device transmits the message for authenticating the mobile device with the second ESS network, and wherein the mobile device uses the common key derived from the identifier to authenticate the mobile device with the second ESS network;

wherein each of the ESS networks comprise two or more basic service set ("BSS") networks.

2. The method of claim 1 wherein the message to the second one of the ESS networks is transmitted by the mobile device prior to the mobile device associating with the second one of the ESS networks.

3. The method of claim 2 wherein the message comprises an indication whether the mobile device has previously been associated with one of the plurality of ESS networks.

4. The method of claim 3 wherein a transition is expedited to the second one of the ESS networks by the mobile device from the first one of the ESS networks.

5. The method of claim 1 wherein the common key holder comprises an Extended Authentication Server ("EAS").

6. The method of claim 5 wherein the common key is derived at the mobile device and derived at the EAS for authentication of the mobile device with the first one of the ESS networks and the second one of the ESS networks.

7. The method of claim 5 wherein the EAS comprises software that communicates through the plurality of ESS networks, wherein the plurality of ESS networks advertises an extended capability bit that indicates an ability for an expedited transition between two of the plurality of ESS networks.

8. The method of claim 5 wherein the EAS communicates with the mobile device to confirm authentication of the common key that is generated at the mobile device and the EAS, wherein a transition of the mobile device is expedited between ESS networks associated with the EAS.

9. The method of claim 1 wherein the identifier for the common key holder is received in an access network query protocol (ANQP) message.

10. A method for network authentication comprising:
receiving, by a mobile device, a first key identifier associated with a first Extended Service Set ("ESS") network;
receiving, by a mobile device, a second key identifier associated with a second ESS network, wherein the first key identifier and the second key identifier are the same and identify a single Extended Authentication Server ("EAS"); and
transmitting, by the mobile device, an expedited authentication request for the second ESS network, wherein the mobile device previously authenticated with the first ESS network using a calculated common key generated at the mobile device based on the first key identifier, and wherein the expedited authentication request includes the calculated common key generated at the mobile device based on the second key identifier.

11. The method of claim 10 wherein the first key identifier and the second key identifier comprise an identity of a common key holder that is common to the first ESS network and the second ESS network.

12. The method of claim 11 wherein the EAS is common to both the first ESS network and the second ESS network.

13. The method of claim 12 wherein the EAS comprises software that communicates through the first ESS network and the second ESS network.

14. The method of claim 10 wherein the first network and the second ESS network transmit an extended capability bit that indicates an ability for expedited transition between the first ESS network and the second ESS network.

15. The method of claim 14 wherein the expedited transition comprises an expedited authentication for the mobile device with the second ESS network based on a prior authentication for the mobile device with the first ESS network.

16. The method of claim 10 wherein the first key identifier is received in a first an access network query protocol (ANQP) message and the second key identifier is received in a second ANQP message.

17. The method of claim 10 wherein the common key is generated at the mobile device and at the EAS for the purpose of authenticating the mobile device with the first ESS network and with the second ESS network, and wherein the common key is not transmitted with the first key identifier or with the second key identifier.

18. A method for transitioning between wireless networks comprising:
determining, by a mobile device, based on at least one network advertisement, when a current Extended Service Set ("ESS") network has a first key holder identifier;
receiving, by the mobile device, prior to association of the mobile device with a new ESS network, a second key holder identifier for the new ESS network; and
transitioning, by the mobile device, between the current ESS network and the new ESS network, wherein the transitioning comprises:
comparing the first key holder identifier and the second key holder identifier;
responsive to determining that the first key holder identifier is the same as the second key holder identifier, calculating a common key for the new ESS and
initiating an expedited authentication process with the new ESS network by utilizing the common key, wherein the common key is common to both the current ESS network and the new ESS network.

19. The method of claim 18 wherein the first key holder identifier and the second key holder identifier identify an Extended Authentication Server ("EAS").

20. The method of claim 18 wherein the transition comprises an expedited transition when the first key holder identifier is the same as the second key holder identifier.

21. The method of claim 18 wherein the determining comprises receiving the first key holder identifier from the current ESS network.

22. The method of claim 20 wherein the current ESS network and the new ESS network transmit an extended capability bit that indicates an ability for the expedited transition between the current ESS network and the new ESS network.

* * * * *

UNITED STATES PATENT AND TRADEMARK OFFICE
CERTIFICATE OF CORRECTION

| | | |
|---|---|---|
| PATENT NO. | : 9,204,299 B2 | Page 1 of 1 |
| APPLICATION NO. | : 13/469618 | |
| DATED | : December 1, 2015 | |
| INVENTOR(S) | : Stephen McCann et al. | |

It is certified that error appears in the above-identified patent and that said Letters Patent is hereby corrected as shown below:

In the claims
Claim 1, Column 17, Line 3 replace "networks" with --network--

Signed and Sealed this
Twenty-second Day of March, 2016

Michelle K. Lee
*Director of the United States Patent and Trademark Office*